United States Patent
Uemura et al.

(10) Patent No.: US 10,031,437 B2
(45) Date of Patent: Jul. 24, 2018

(54) LIGHT EMITTING DEVICE AND IMAGE FORMING DEVICE

(71) Applicant: KONICA MINOLTA, INC., Chiyoda-ku, Tokyo (JP)

(72) Inventors: Takaki Uemura, Seto (JP); Yasushi Nagasaka, Okazaki (JP); So Yano, Ibaraki (JP); Masayuki Iijima, Okazaki (JP); Takahiro Matsuo, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/938,471

(22) Filed: Nov. 11, 2015

(65) Prior Publication Data

US 2016/0150623 A1 May 26, 2016

(30) Foreign Application Priority Data

Nov. 26, 2014 (JP) ................................ 2014-238465

(51) Int. Cl.
G03G 15/043 (2006.01)
H05B 33/08 (2006.01)
G03G 15/04 (2006.01)

(52) U.S. Cl.
CPC ....... *G03G 15/043* (2013.01); *H05B 33/0803* (2013.01); *H05B 33/0866* (2013.01);
(Continued)

(58) Field of Classification Search
CPC .................................. H05B 33/0896
See application file for complete search history.

(56) References Cited

U.S. PATENT DOCUMENTS 5,659,884 A * 8/1997 Daughtry, Jr. ........... H03B 5/32
331/158
7,498,553 B2  3/2009 Shimokawa
(Continued)

FOREIGN PATENT DOCUMENTS

CN          1928972 A    3/2007
CN        101102386 A    1/2008
(Continued)

OTHER PUBLICATIONS

JP_2004070349_A_T Machine Translation, 2004, Koyama, Japan.*
Office Action (Notification of Reasons for Refusal) dated Nov. 29, 2016, by the Japanese Patent Office in corresponding Japanese Patent Application No. 2014-238465 and an English Translation of the Office Action. (5 pages).
(Continued)

*Primary Examiner* — Victor Verbitsky
(74) *Attorney, Agent, or Firm* — Buchanan Ingersoll & Rooney, PC

(57) ABSTRACT

A light-emitting device including a light-emitting element and causing the light emitting element to emit different light amounts. The light-emitting device includes: a measurement unit, a predetermined value storage unit, and a driving signal calculation unit. The measurement unit measures a surrounding temperature of the light-emitting element. The predetermined value storage unit stores a predetermined value of a driving signal for causing the light-emitting element to emit light. The driving signal calculation unit executes calculation of a value of the driving signal for causing the light-emitting element to emit a desired light amount by applying a correction factor in accordance with the measured surrounding temperature and the desired light amount to the predetermined value of the driving signal.

12 Claims, 13 Drawing Sheets

(52) U.S. Cl.
CPC ... *H05B 33/0896* (2013.01); *G03G 15/04054* (2013.01); *G03G 2215/0132* (2013.01); *Y02B 20/36* (2013.01)

(56) References Cited

U.S. PATENT DOCUMENTS

| | | | |
|---|---|---|---|
| 2001/0040676 A1* | 11/2001 | Hirata | G03G 15/5062 355/77 |
| 2007/0052983 A1 | 3/2007 | Nakajima | |
| 2009/0140658 A1* | 6/2009 | Jo | H05B 33/0851 315/155 |
| 2009/0190943 A1* | 7/2009 | Yamashita | G03G 15/043 399/51 |
| 2010/0253715 A1 | 10/2010 | Odawara et al. | |
| 2015/0244956 A1* | 8/2015 | Furuya | H04N 5/3675 348/246 |

FOREIGN PATENT DOCUMENTS

| | | | |
|---|---|---|---|
| JP | 2003-029710 A | | 1/2003 |
| JP | 2004-70349 A | | 3/2004 |
| JP | 2004070349 A | * | 3/2004 |
| JP | 2007-122001 A | | 5/2007 |
| JP | 2009-66832 A | | 4/2009 |
| JP | 2010-076223 A | | 4/2010 |
| JP | 5343073 B2 | | 11/2013 |

OTHER PUBLICATIONS

Office Action dated Jan. 2, 2018, by the State Intellectual Propery Office of the People's Rebublic of China in corresponding Chinese Patent Application No. 201510821172.X and Englinsh translation of the Office Action (18 pages).

* cited by examiner

503

|  |  | Desired light amount | | |
|---|---|---|---|---|
|  |  | L1 | L2 | L3 |
| Surrounding temperature range | T1 | 1.011 | 1.022 | 1.034 |
|  | T2 | 1.010 | 1.020 | 1.032 |
|  | T3 | 1.007 | 1.016 | 1.028 |

Corrected driving current amount

FIG. 12A

| Light emission duration H0 | | Driving current amount | | |
|---|---|---|---|---|
| | | I1 | I2 | I3 |
| Surrounding temperature | T1 | 0 | 0 | 0 |
| | T2 | 0 | 0 | 0 |
| | T3 | 0 | 0 | 0 |

FIG. 12B

| Light emission duration H1 | | Driving current amount | | |
|---|---|---|---|---|
| | | I1 | I2 | I3 |
| Surrounding temperature | T1 | 1.07 | 1.04 | 1.01 |
| | T2 | 1.07 | 1.04 | 1.01 |
| | T3 | 1.05 | 1.02 | 1.00 |

FIG. 12C

| Light emission duration H2 | | Driving current amount | | |
|---|---|---|---|---|
| | | I1 | I2 | I3 |
| Surrounding temperature | T1 | 1.19 | 1.08 | 1.03 |
| | T2 | 1.13 | 1.06 | 1.02 |
| | T3 | 1.11 | 1.05 | 1.01 |

FIG. 13A

| Deterioration index D = 0 | | Desired light amount | | |
|---|---|---|---|---|
| | | L1 | L2 | L3 |
| Surrounding temperature | T1 | 1.011 | 1.022 | 1.034 |
| | T2 | 1.010 | 1.020 | 1.032 |
| | T3 | 1.007 | 1.016 | 1.028 |

FIG. 13B

| Deterioration index D = 1.07 | | Desired light amount | | |
|---|---|---|---|---|
| | | L1 | L2 | L3 |
| Surrounding temperature | T1 | 1.005 | 1.017 | 1.019 |
| | T2 | 1.002 | 1.010 | 1.011 |
| | T3 | 0.999 | 1.005 | 1.006 |

FIG. 13C

| Deterioration index D = 1.08 | | Desired light amount | | |
|---|---|---|---|---|
| | | L1 | L2 | L3 |
| Surrounding temperature | T1 | 1.005 | 1.002 | 1.008 |
| | T2 | 1.001 | 0.996 | 1.000 |
| | T3 | 0.998 | 0.991 | 0.994 |

LIGHT EMITTING DEVICE AND IMAGE FORMING DEVICE

This application is based on an application No. 2014-238465 filed in Japan, the contents of which are hereby incorporated by reference.

BACKGROUND OF THE INVENTION (1) Field of the Invention

The present invention relates to a light-emitting device and an image forming device, and in particular to a technology for correcting a change in a light emission amount occurring when surrounding temperature changes, with high accuracy.

(2) Description of the Related Art

Conventional technology discloses a technology of applying organic light-emitting diodes (OLEDs) to optical writing devices executing optical writing onto a photoreceptor, for the purpose of downsizing and reducing the cost of image forming devices.

An OLED has a light-emitting characteristic such that, even when a driving current amount input to the OLED does not change, the amount of light emitted by the OLED changes when the temperature of the OLED changes. The temperature of an OLED is under the influence of a surrounding temperature of the OLED. For instance, as illustrated in FIG. 15, the light amount ratio of an OLED decreases as the surrounding temperature of the OLED increases from temperature $T_1$ to temperature $T_2$, which is higher than temperature $T_1$. Such a decrease in the light amount emitted by an OLED may influence an electrostatic latent image that is formed on a photoreceptor, and therefore may unfortunately bring about a decrease in image quality.

Application of OLEDs has been considered in technical fields other than image forming devices as well. Therefore, stabilization of light amounts emitted by OLEDs is an essential problem to be solved in various technical fields. In relation with this problem, for instance, Japanese Patent No. 5343073 discloses a technology for correcting a driving current amount of an OLED. In specific, this conventional technology discloses providing beforehand a table associating different surrounding temperatures each with correction data to be applied to a driving current amount to yield a desired light amount, and correcting a drive current amount of an OLED by referring to this table based on a surrounding temperature of the OLED that is measured by using a temperature sensor. This achieves causing an OLED to emit a desired light amount even when surrounding temperature changes.

Meanwhile, how the light amount of an OLED changes relative to surrounding temperature (hereinafter called a temperature characteristic of an OLED) is affected by a driving current amount supplied to the OLED. That is, a change in the driving current amount input to an OLED affects the temperature characteristic of the OLED. As illustrated in FIG. 16, the gap between the light amount ratio at surrounding temperature $T_1$ (i.e. 100%) and the light amount ratio at surrounding temperature and the light amount at surrounding temperature $T_2$ is greater when the OLED is supplied with a relatively great driving current amount ($I_1$) than when the OLED is supplied with a relatively small driving current amount ($I_3$).

In the technical field of image forming devices, optical writing is executed by collecting light emitted from linearly arranged OLEDs onto a photoreceptor via a rod lens array. However, because the OLEDs are disposed at different positions with respect to the rod lens array, image forming efficiency may vary between the OLEDS. Therefore, even when all the OLEDs are provided with the same driving current amount to cause the OLEDs to emit the same light amount, different areas of the photoreceptor, each corresponding to one pixel, are exposed to different light amounts (i.e., different light exposure amounts).

Light exposure amounts of different areas of the photoreceptor can be made uniform by adjusting driving currents that are input to different OLEDs. However, when OLEDs are supplied with different driving current amounts, light amounts emitted by different OLEDs change in a different manner in response to a change in surrounding temperature. Due to this, the technology disclosed in Japanese Patent No. 5343073 of applying the same correction data to all OLEDs cannot appropriately correct the change in light amounts emitted by the OLEDs occurring when surrounding temperature changes.

SUMMARY OF THE INVENTION

The present invention has been achieved in view of the above problems, and an aim thereof is to provide a light-emitting device and an image forming device that correct a change in a light amount of an OLED occurring when the temperature characteristic of the OLED changes, with high accuracy.

In order to solve the above problems, one aspect of the present invention is a light-emitting device including a light-emitting element and causing the light emitting element to emit different light amounts, the light-emitting device including: a measurement unit measuring a surrounding temperature of the light-emitting element; a predetermined value storage unit storing a predetermined value of a driving signal for causing the light-emitting element to emit light; and a driving signal calculation unit executes calculation of a value of the driving signal for causing the light-emitting element to emit a desired light amount by applying a correction factor in accordance with the measured surrounding temperature and the desired light amount to the predetermined value of the driving signal.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 12A illustrates an example of a deterioration factor table 802, for a light emission duration H0, FIG. 12B illustrates another example of the deterioration factor table 802, for a light emission duration H1, and FIG. 12C illustrates yet another example of the deterioration factor table 802, for a light emission duration H2;

FIG. 13A illustrates an example of a correction factor table 805, when deterioration index D equals zero, FIG. 13B illustrates another example of the correction factor table 805, when deterioration index D equals 1.07, and FIG. 13C illustrates yet another example of the correction factor table 805, when deterioration index D equals 1.08;

DESCRIPTION OF EMBODIMENTS

The following describes embodiments of an optical writing device and an image forming device pertaining to the present invention with reference to the drawings.

[1] First Embodiment

The following describes a first embodiment of the present invention.

(1-1) Configuration of Image Forming Device

Figure 1:
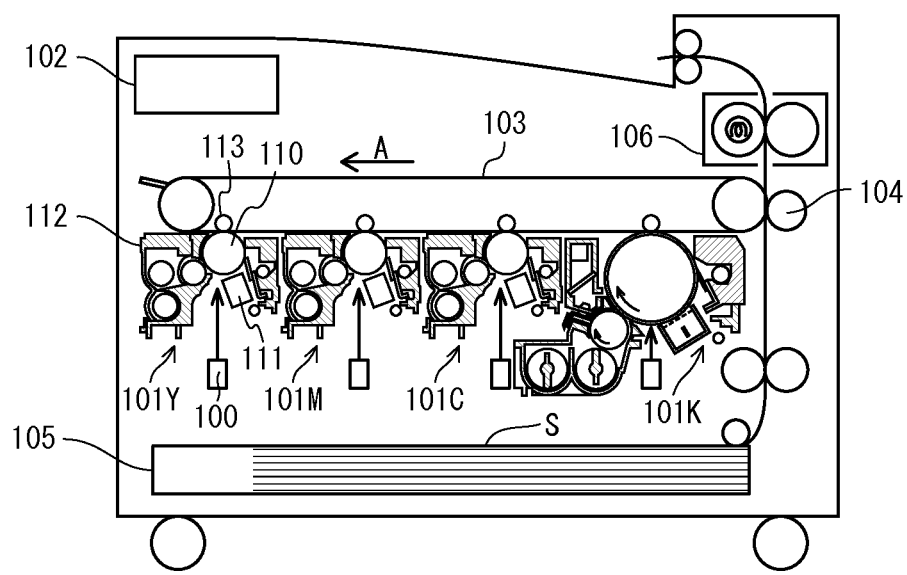
FIG. 1 illustrates an overall configuration of an image forming device pertaining to a first embodiment of the present invention.

FIG. 1 illustrates an overall configuration of an image forming device pertaining to the present embodiment. As illustrated in FIG. 1, an image forming device 1 is a color printer device of a so-called tandem type. The image forming device 1 includes image forming units 101Y, 101M, 101C, and 101K. Each of the image forming units 101Y, 101M, 101C, and 101K forms, by being controlled by a control unit 102, a toner image of a corresponding one of the developing colors yellow (Y), magenta (M), cyan (C), and black (K).

For instance, in the image forming unit 101Y, a charging device 111 uniformly charges an outer circumferential surface of a photoreceptor drum 110. An optical writing device 100 includes, as described in the following, a plurality of light-emitting elements (OLEDs) linearly arranged along a main scanning direction. The optical writing device 100 causes the OLEDs to emit light in accordance with digital luminance signals that the control unit 102 generates. Because of this, optical writing is executed onto the outer circumferential surface of the photoreceptor drum 110 and an electrostatic latent image is formed.

A developing device 112 supplies the outer circumferential surface of the photoreceptor drum 110 with toner and develops the electrostatic latent image to form a toner image. A primary transfer roller 113 electrostatically transfers the toner image from the photoreceptor drum 110 onto an intermediate transfer belt 103 (primary transfer).

Similarly, toner images of the M, C, K colors, respectively formed by the image forming units 101M, 101C, 101K, are primarily transferred onto the intermediate transfer belt 103 so as to overlap with each other and form a color toner image. When the color toner image arrives at a pair of secondary transfer rollers 104 due to being conveyed by the intermediate transfer belt 103, a recording sheet S that a paper feed cassette 105 supplies is conveyed to the pair of the secondary transfer rollers 104.

The pair of the secondary transfer rollers 104 electrostatically transfers the toner image on the intermediate transfer belt 103 onto the recording sheet S (secondary transfer). A fixing device 106 then fuses and fixes the toner image onto the recording sheet S. Then, the recording sheet S is ejected to an outside of the image forming device 1.

(1-2) Configuration of Optical Writing Device 100

The following describes a configuration of the optical writing device 100.

Figure 2:
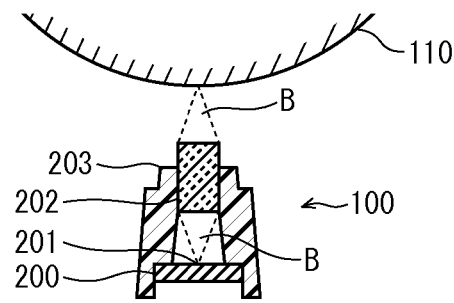
FIG. 2 is a cross-sectional view describing an optical writing operation by an optical writing device 100.

FIG. 2 is a cross-sectional view illustrating an optical writing operation by the optical writing device 100. As illustrated in FIG. 2, the optical writing device 100 includes an OLED panel unit 200 and a rod lens array (SLA: SELFOC lens array; SELFOC is a registered trademark of Nippon Sheet Glass Co. LTD.) 202 that are accommodated in a holder 203. OLEDs 201 are mounted on the OLED panel unit 200. Light beams B that the OLEDs 201 emit are collected onto the outer circumferential surface of the photoreceptor drum 110 by the rod lens array 202.

The rod lens array 202 is composed of a plurality of columnar rod lenses. Positions of the columnar rod lenses of the rod lens array 202 relative to each of the OLEDs 201 vary. Accordingly, the principal light beam that each of the OLEDs 201 emits does not necessarily coincide with the optical axis of a columnar rod lens, and thus the image forming efficiency of the rod lens array 202 varies for different OLEDs 201. Therefore, even when all the OLEDs 201 are supplied with the same driving current amount, different areas of the photoreceptor drum 110 receive different light exposure amounts.

In order to make uniform the light exposure amounts that the photoreceptor drum 110 receives from different OLEDs 201, light emission amounts of the OLEDs 201 need to be adjusted. Light emission amounts of the OLEDs 201 adjusted so that the photoreceptor drum 110 receives the same light exposure amount from all of the OLEDs 201 are referred to in the following as desired light amounts of the OLEDs 201. Note that OLEDs 201 corresponding to portions of the rod lens array 202 having lower image forming efficiencies have greater desired light amounts L. In the present embodiment, the desired light amounts L of the OLEDs 201 are categorized into N kinds of desired light amounts $L_1$ through $L_N$, with a desired light amount with a smaller value of N indicating a greater light amount.

Figure 3:
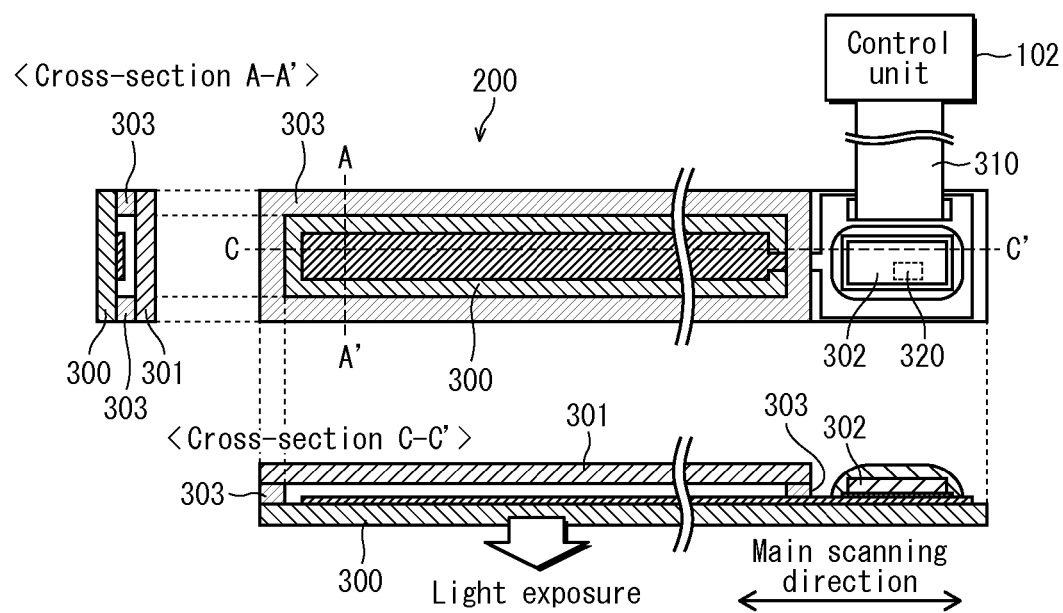
FIG. 3 includes a schematic plan view of an OLED panel unit 200, in addition to a cross-sectional view taken along line A-A' and a cross-sectional view taken along line C-C'.

FIG. 3 includes a schematic plan view of the OLED panel unit 200, in addition to a cross-sectional view taken along line A-A' and a cross-sectional view taken along line C-C'. The schematic plan view illustrates a state in which a sealing plate 301 (described later) has been removed.

As illustrated in FIG. 3, the OLED panel unit 200 includes, for instance, a thin film transistor (TFT) substrate 300, a sealing plate 301, and a driver IC (Integrated Circuit) 302. A great number of OLEDs 201 are linearly arranged on the TFT substrate 300 along the main scanning direction. The OLEDs 201 may be arranged in one row, or may be arranged in a zigzag pattern.

In addition, the region of the TFT substrate 300 where the OLEDs 201 are arranged is sealed. A sealing plate 301 is attached so that a spacer frame body 303 is sandwiched by the TFT substrate 300 and the sealing plate 301. When providing the sealing, dry nitrogen etc. is introduced so that the region where the OLEDs are arranged is not exposed to ambient air. In addition, when providing the sealing, a moisture absorber may also be introduced for the purpose of absorbing moisture. The sealing plate 301 may be, for instance, a sealing glass, or may be made of a material other than glass.

The driver IC 302 is mounted on the TFT substrate 300 outside the sealed region. The control unit 102 inputs digital luminance signals to the driver IC 302 via a flexible wire 310. The control unit 102 may have a dedicated application specific integrated circuit (ASIC) built in thereto for generating the digital luminance signals.

The driver IC 302 converts the digital luminance signals to analog luminance signals (hereinafter, referred to simply as luminance signals) and inputs the luminance signals to driving circuits provided one-to-one to the OLEDs 201. Each of the driving circuits generates a driving current for the corresponding OLED 201, in accordance with a luminance signal. The luminance signal may be a current signal or a voltage signal. In addition, the driver IC 302 has a built-in temperature sensor 320 that measures the temperature of the driver IC 302 as a surrounding temperature of the OLEDs 201.

Figure 4:
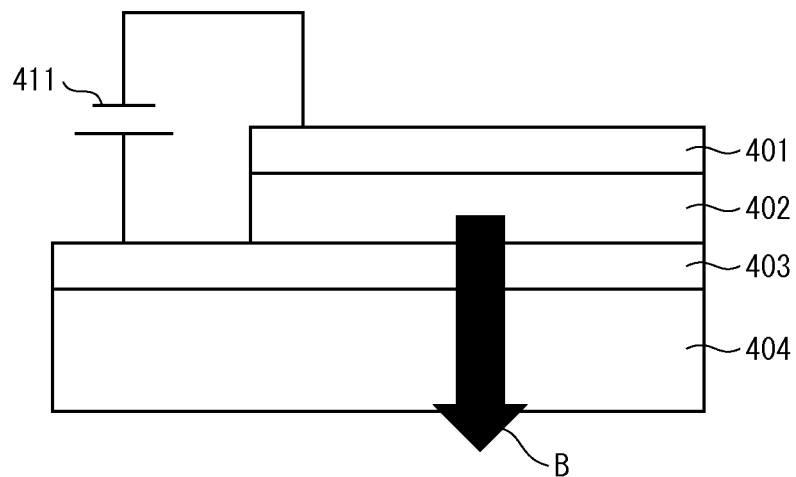
FIG. 4 is a cross-sectional view illustrating a typical configuration of each OLED 201.

FIG. 4 is a cross-sectional view illustrating a typical configuration of each of the OLEDs 201. As illustrated in FIG. 4, each OLED 201 is composed of four layers: a cathode 401; an organic layer 402; an anode 403; and a light-transmissive substrate 404. The anode 403 is a light-transmissive electrode that is made of, for instance, indium tin oxide (ITO), and the cathode 401 is an electrode that is made of, for instance, aluminum. The OLED 201 emits light when a driving current is supplied to the organic layer 402, and the light reaches the outside of the OLED 201 after passing through the anode 403 and the light-transmissive substrate 404.

(1-3) Configuration of Driver IC 302

The following describes a configuration of the driver IC 302.

Figure 5:
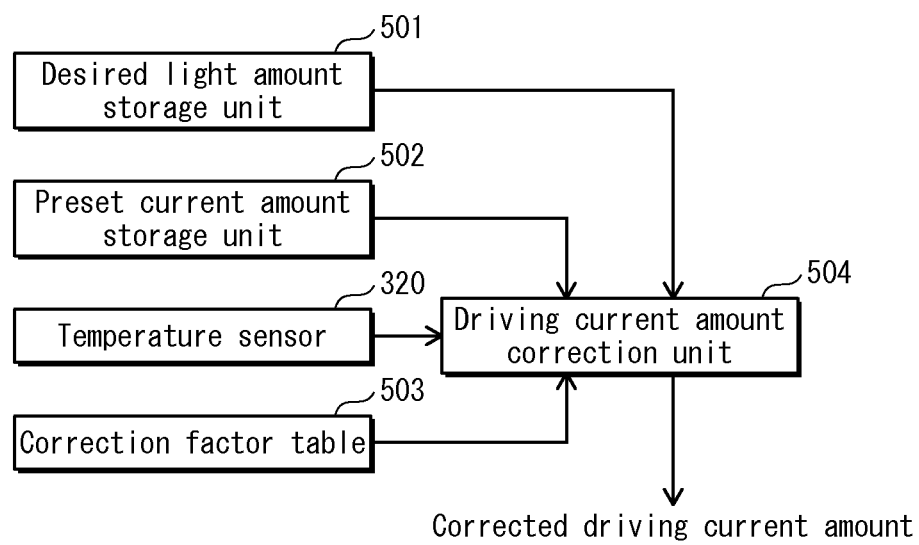
FIG. 5 is a block diagram illustrating main functional blocks of a driver IC 302.

FIG. 5 is a block diagram illustrating main functional blocks of the driver IC 302. The driver IC 302 includes a desired light amount storage unit 501 and a preset current amount storage unit 502. The desired light amount storage unit 501 stores identifiers each corresponding to one OLED 201 and identifying a desired light amount L of the OLED 201 (hereinafter referred to as desired light amount identifiers). The preset current amount storage unit 502 stores driving current amounts each corresponding to one of the desired light amounts identifiers (hereinafter referred to as preset driving current amounts). Each preset driving current amount causes one or more OLEDs 201 indicated by the corresponding desired light amount identifier to emit the desired light amount L in an initial state and in a predetermined surrounding temperature (for instance, any of the temperatures of the standard state, namely, 20, 23, or 25 degrees Celsius, as specified in Japanese Industrial Standards (JIS) Z 8703). A correction factor table 503 stores correction factors each corresponding to a combination of one surrounding temperature range and one desired light amount identifier.

A driving current amount correction unit 504 refers to the surrounding temperature that the temperature sensor 320 has measured. Further, for each of the OLEDs 201, the driving current amount correction unit 504 reads out a correction factor from the correction factor table 503. A correction factor to be read out for a given OLED 201 is one of the correction factors in the correction factor table 503 that is associated with a combination of a surrounding temperature range including the measured surrounding temperature and a desired light amount identifier corresponding to the given OLED 201. Further, for each of the OLEDs 201, the driving current amount correction unit 504 further reads out, from the preset current amount storage unit 502, a preset driving current amount associated with the desired light amount identifier corresponding to the OLED 201, and performs correction of driving current amount with respect to the OLED 201 by multiplying the preset driving current amount by the correction factor.

Figure 6:
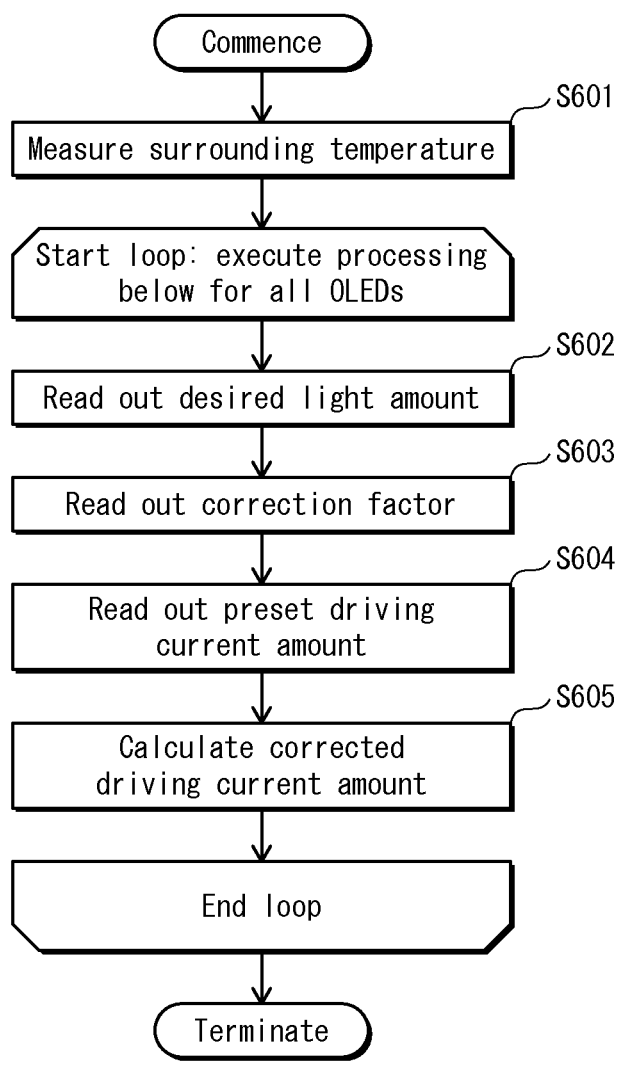
FIG. 6 is a flowchart illustrating a method for correcting a change in light amount of each OLED 201 occurring when surrounding temperature changes, while taking into account a driving current of the OLED 201.

(1-4) Correction of Change in Light Amount Occurring when Surrounding Temperature Changes The following describes a method for correcting the change in light amounts of the OLEDs 201 occurring when the surrounding temperature changes, with reference to the flowchart in FIG. 6.

The driver IC 302 measures, in advance to causing the OLEDs 201 to emit light, the surrounding temperature of the OLEDs 201 by utilizing the temperature sensor 320 (S601). Then, for each of the OLEDs 201, the driver IC 302 executes the loop of processing between steps S602 and S605.

First, in S602, the driver IC 302 reads out the desired light amount identifier corresponding to the target OLED 201 from the desired light amount storage unit 501. In the present embodiment, numbers from 1 through N are used as the desired light amount identifiers. Further, the preset driving current amounts $I_1$ through $I_N$ respectively correspond to the desired light amounts $L_1$ through $L_N$. Further, the preset driving current amount $I_1$ indicates the greatest current amount, and the current amounts indicated by the present driving current amounts decrease as the ordinal number increases from "1" to "N".

Next, in S603, the driving current amount correction unit 504 reads out a correction factor for calculating the corrected driving current amount to be actually supplied to the target OLED 201 (hereinafter referred to as the corrected driving current amount for the target OLED 201). Here, the driving current amount correction unit 504 first specifies a correction factor γ corresponding to the combination of the measured surrounding temperature and the desired light amount $L_n$ of the target OLED 201 by referring to the correction factor table 503. The correction factor table 503 stores correction factors γ each corresponding to a different combination of a surrounding temperature range $T_m$ (where m is a positive real number within the range of 1 to M) and a desired light amount $L_n$. In specifying the correction factor γ for the target OLED 201, the driving current amount correction unit 504 refers to a temperature range column in the correction factor table 503 corresponding to a surrounding temperature range $T_m$ including the surrounding temperature measured in S601.

Then, the driving current amount correction unit 504 reads out a preset driving current amount $I_n$ corresponding to the desired light amount $L_n$ of the target OLED 201 from the preset current amount storage unit 502 (S604). Further, the driving current amount correction unit 504 multiplies the preset driving current amount $I_n$ by the correction factor γ to calculate the corrected driving current amount to be actually supplied to the target OLED 201 to cause the target OLED 201 to emit the desired light amount $L_n$ (S605). In the present embodiment, the preset current amount storage unit 502 stores preset driving current amounts $I_1$ through $I_N$ each corresponding to a different one of the desired light amounts $L_1$ through $L_N$.

Figures 7, 8:
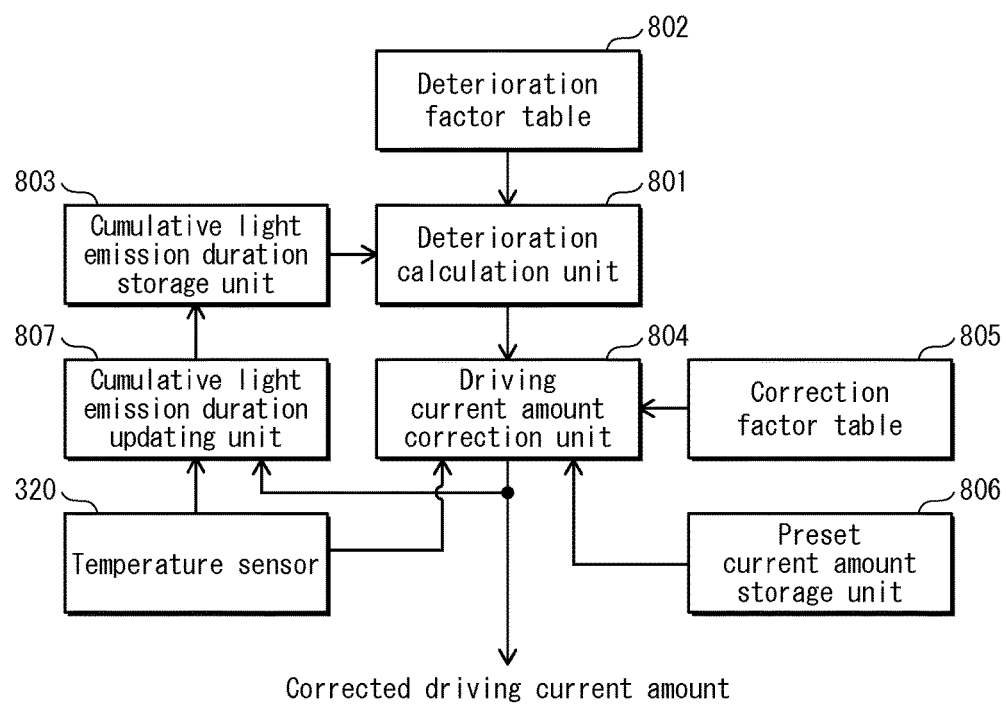
FIG. 7 is an example of a correction factor table 503.
FIG. 8 is a block diagram illustrating main functional blocks of the driver IC 302 in a second embodiment of the present invention.

FIG. 7 is an example of the correction factor table 503. Among the correction factors γ in the correction factor table 503, a correction factor γ for causing an OLED 201 whose desired light amount is $L_1$ to actually emit the desired light amount $L_1$ when the measured surrounding temperature is included in the temperature range $T_1$ is 1.011 (FIG. 7). Thus, the corrected driving current amount for this OLED 201 in the instant surrounding temperature, which is calculated by multiplying the preset driving current amount $I_1$ corresponding to the desired light amount $L_1$ by the correction factor γ, is calculated as the following.

$$I = 1.011 \times I_1$$

In a similar manner, the driving current amount correction unit 504 calculates the corrected driving current amount for each of the OLEDs 201.

This configuration achieves correction of the change of light amounts of the OLEDs 201 with high accuracy. This is since, even when the change of light amount occurring when the surrounding temperature changes differs among the OLEDs 201 due to the OLEDs 201 having different preset driving current amounts, correction factors γ corresponding to the respective preset driving current amounts are used in the correction.

[2] Second Embodiment

The following describes a second embodiment of the present invention. An image forming device pertaining to the second embodiment has almost the same configuration as the image forming device pertaining to the first embodiment described above, but differs from the first embodiment with regard to the method for correcting driving current amounts. The following description focuses mainly on differences between the image forming device pertaining to the second embodiment and the image forming device pertaining to the first embodiment. Accordingly, the same reference signs are utilized for members described in both the first embodiment and the second embodiment.

The higher the surrounding temperature in which an OLED emits light is, the faster the OLED deteriorates. Japanese Patent Application Publication No. 2003-029710 is one example of conventional technology disclosing a technology for correcting a light emission amount of an OLED such that the higher the surrounding temperature in which the OLED has emitted light in the past, the greater the driving current amount supplied to the OLED. However, it should be noted that the temperature characteristic of an OLED changes as the OLED deteriorates over time.

That is, repetition of detailed experiments has revealed that the temperature characteristic of an OLED may change in the following manner, for example. That is, the temperature characteristic of an OLED whose light emission amount decreases as surrounding temperature increases may change over time such that the light emission amount of the OLED conversely increases as surrounding temperature increases when deterioration of the OLED progresses, even when the OLED is always supplied with the same driving current amount. Therefore, merely increasing the driving current amount supplied to an OLED as disclosed in the above conventional technology cannot suppress the change in light emission amount of the OLED occurring due to temperature characteristic of the OLED changing as deterioration progresses.

Accordingly, in the present embodiment, correction of driving current amount is performed while taking into account the change in OLED temperature characteristic occurring as deterioration of an OLED progresses.

(2-1) Configuration of Driver IC 302

The following describes the driver IC 302 pertaining to the present embodiment.

FIG. 8 is a block diagram illustrating main functional blocks of the driver IC 302 in the second embodiment. The driver IC 302 calculates, in order to correct the change in light amounts of the OLEDs 201 occurring when surrounding temperature changes, a deterioration level of each of the OLEDs 201. When executing the calculation, the driver IC 302 utilizes a deterioration calculation unit 801. The deterioration calculation unit 801 calculates, for each of the OLEDs 201, a deterioration index D indicating a deterioration level of the OLED 201 as described in the following, by referring to a deterioration factor table 802 and a cumulative light emission duration storage unit 803 storing cumulative light emission durations for each of the OLEDs 201. The deterioration factor table 802 and the cumulative light emission duration storage unit 803 are described in detail later.

The cumulative light emission duration storage unit 803 stores a plurality of cumulative light emission durations for each of the OLEDs 201. Each of the cumulative light emission durations for one OLED 201 corresponds to a combination of one surrounding temperature in which the OLED 201 has emitted light in the past and one driving current amount used in the past for causing the OLED 201 to emit light. For instance, for a given OLED 201, the cumulative light emission duration storage unit 803 stores: (i) a cumulative light emission duration $H_1$ corresponding to the combination of a surrounding temperature $T_1$ and a driving current amount $I_1$; (ii) a cumulative light emission duration $H_2$ corresponding to the combination of a surrounding temperature $T_2$ and a driving current amount $I_2$; and (iii) a cumulative light emission duration $H_3$ corresponding to the combination of a surrounding temperature $T_3$ and a driving current amount $I_3$.

The deterioration factor table 802 stores, as exemplified in FIG. 12A, FIG. 12B, and FIG. 12C, deterioration factors δ each corresponding to a different combination of one cumulative light emission duration, one surrounding temperature, and one driving current amount. Specifically, for instance, a deterioration factor $\delta_{11}$ corresponding to the combination of a cumulative light emission duration $H_0$, a surrounding temperature $T_1$, and a driving current amount $I_1$ is 0 (FIG. 12A). In the same manner, a deterioration factor $\delta_{22}$ corresponding to the combination of a cumulative light emission duration $H_1$, a surrounding temperature $T_2$, and a driving current amount $I_2$ is 1.04 (FIG. 12B). Further, a deterioration factor $\delta_{33}$ corresponding to the combination of the cumulative light emission duration $H_2$, the surrounding temperature $T_3$, and a driving current amount $I_3$ is 1.01 (FIG. 12C).

For each OLED 201, a driving current amount correction unit 804 calculates the corrected driving current amounts to be supplied to the OLED 201 by applying the deterioration index D calculated by the deterioration calculation unit 801 to the preset driving current amount of the OLED 201. In order to execute this correction, the driving current amount correction unit 804 specifies the correction factor γ for the OLED 201 by referring to the surrounding temperature measured by the temperature sensor 320 and a correction factor table 805 described later. Further, a preset current amount storage unit 806 stores driving current amounts for causing the OLEDs 201 to each emit a desired light amount $L_n$ in an initial state before deterioration (hereinafter referred to as preset driving current amounts). A corrected driving current amount for each OLED 201 is calculated by multiplying the preset driving current amount of the OLED 201 by the specified correction factor γ.

The correction factor table 805 stores, as exemplified in FIG. 13A, FIG. 13B, and FIG. 13C, correction factors γ. The correction factors γ each correspond to a different combination of one deterioration index D, one preset driving current amount corresponding to one desired light amount $L_n$, and one surrounding temperature. Specifically, the correction factor γ when deterioration index D is 0, desired light amount is $L_1$, and surrounding temperature is $T_1$ is 1.011 (FIG. 13A).

For each OLED 201, a cumulative light emission duration updating unit 808 calculates a cumulative light emission duration for each combination of one driving current amount and one surrounding temperature. That is, the cumulative light emission duration updating unit 808, for a combination of one driving current amount and one surrounding temperature, calculates a total amount of time for which the OLED 201 has performed light emission under the condition defined by the combination, as a cumulative light emission duration. Further, the cumulative light emission duration updating unit 808 stores the cumulative light emission durations so calculated to the cumulative light emission duration storage unit 803.

Figure 9:
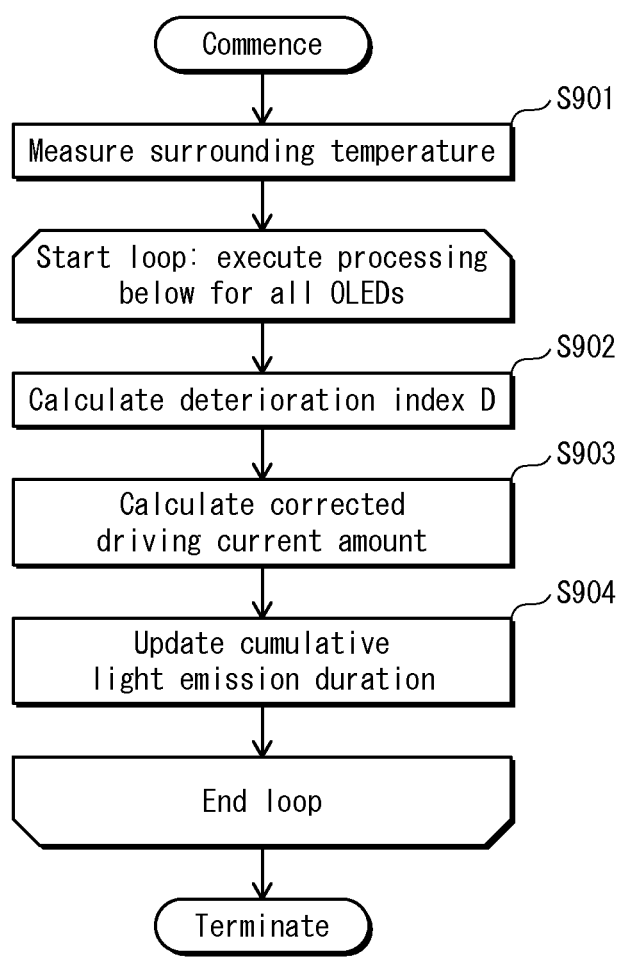
FIG. 9 is a flowchart illustrating a method for correcting the change in light amount of each OLED 201 occurring when surrounding temperature changes, by taking into account a deterioration index of the OLED 201.

(2-2) Correction of Change in Light Amount Occurring when Surrounding Temperature Changes The following describes a method for correcting the change in light amounts of the OLEDs 201 occurring when the surrounding temperature changes, with reference to the flowchart in FIG. 9.

The driver IC 302 measures, in advance to causing the OLEDs 201 to emit light, the surrounding temperature of the OLEDs 201 by utilizing the temperature sensor 320 (S901). Then, for each of the OLEDs 201, the driver IC 302 executes the loop of processing between steps S902 and S904. First, in S902, the driver IC 302 calculates a deterioration index D for the target OLED 201 by utilizing the deterioration calculation unit 801.

In the present embodiment, the preset driving current amounts $I_1$ through $I_N$ respectively correspond to the desired light amounts $L_1$ through $L_N$. Further, the preset driving current amount $I_1$ indicates the greatest current amount, and the current amounts indicated by the present driving current amounts decrease as the ordinal number increases from "1" to "N". Thus, the preset driving current amount $I_N$ indicates the smallest current amount. Note that supplying the OLEDs 201 each with a corresponding one of the preset driving current amounts $I_1$ through $I_N$ achieves the reception of the same light exposure amount from the OLEDs 201, provided that the OLEDs 201 are in an initial state before deterioration and in a predetermined surrounding temperature.

Figure 10A:
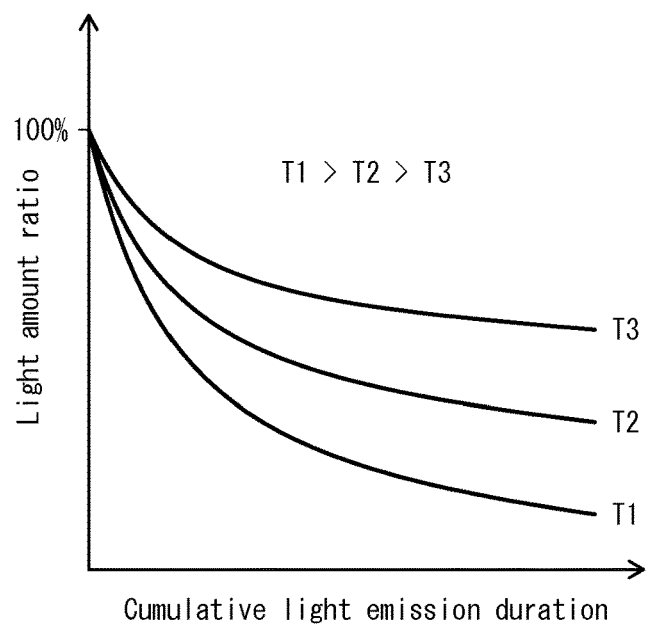
FIG. 10A includes graphs each corresponding to a different surrounding temperature and illustrating an example of how light amount of an OLED 201 changes over time when driving current amount supplied to the OLED 201 does not change over time, and FIG. 10B includes graphs each corresponding to a different desired light amount and illustrating an example of how light amount of an OLED 201 changes over time when driving current amount supplied to the OLED 201 does not change over time.
Figure 10B:
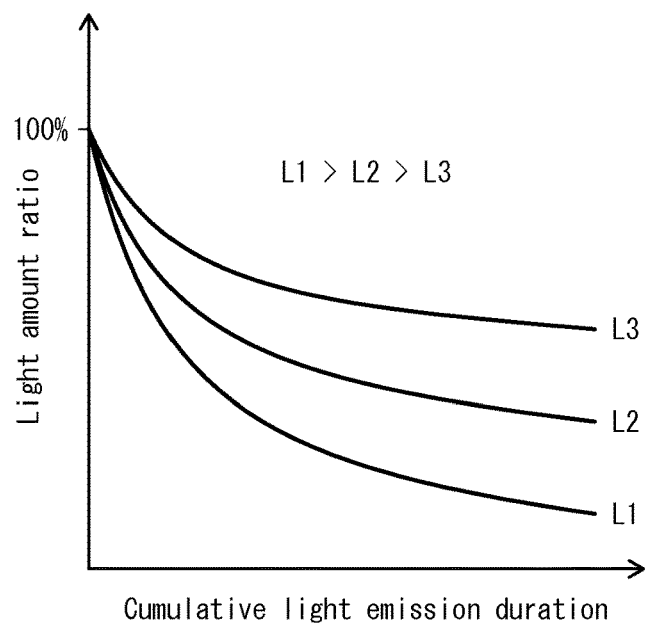

Further, the OLEDs 201 have a characteristic such that the higher the surrounding temperature of an OLED 201 is, the faster the OLED 201 deteriorates. Also, the greater the driving current amount supplied to an OLED 201 is, the faster the OLED 201 deteriorates. FIG. 10A and FIG. 10B each include graphs illustrating an example of how a light amount of an OLED 201 changes over time when driving current amount supplied to the OLED 201 does not change over time. The vertical axis in each of FIG. 10A and FIG. 10B illustrates a ratio of light emission amount after deterioration to the initial light emission amount. The horizontal axis in each of FIG. 10A and FIG. 10B illustrates the cumulative light emission duration. Note that the ratio of light emission amount after deterioration to the initial light emission amount represents a change in light amount.

Figure 11A:
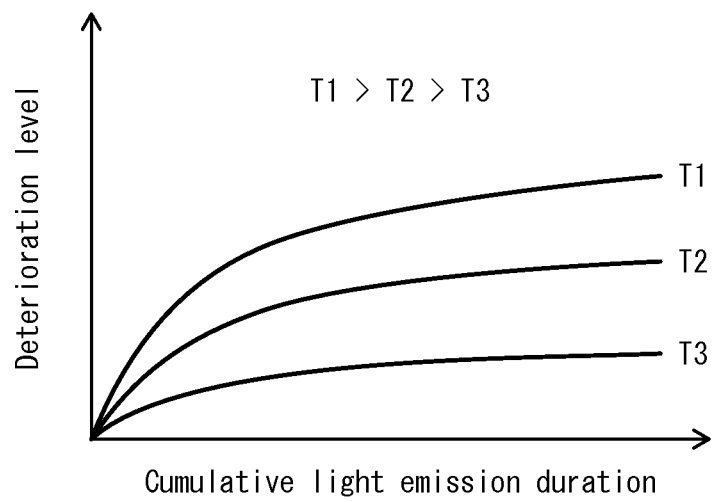
FIG. 11A includes graphs each corresponding to a different surrounding temperature and illustrating an example of how a deterioration level of an OLED 201 changes over time when driving current amount supplied to the OLED 201 does not change over time, and FIG. 11B includes graphs each corresponding to a different desired light amount and illustrating an example how the deterioration level of an OLED 201 changes over time when driving current amount supplied to the OLED 201 does not change over time.

The three graphs in FIG. 10A correspond to surrounding temperatures $T_1$, $T_2$, and $T_3$, and each illustrate an example of a change in light emission amount of an OLED. Note that surrounding temperature $T_1$ is highest and surrounding temperature $T_3$ is lowest among the three surrounding temperatures. As illustrated in FIG. 10A, the drop in light emission amount of the OLED occurring as the cumulative light emission duration becomes longer is greatest for surrounding temperature $T_1$. From this, it can be assumed that the higher the surrounding temperature is, the faster an OLED deteriorates (FIG. 11A).

Figure 11B:
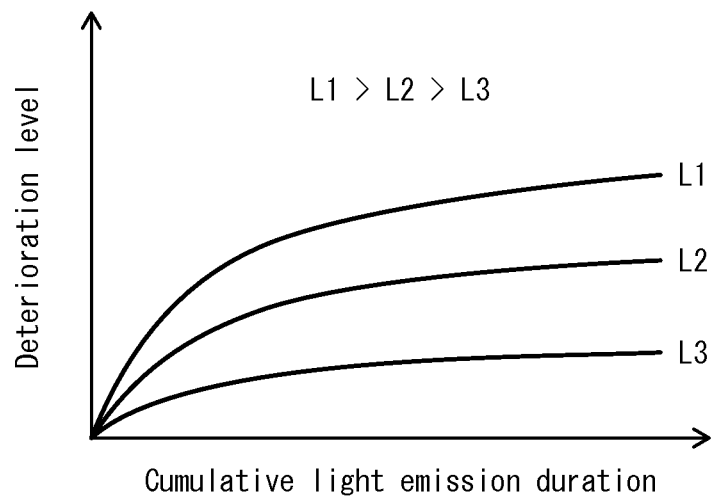

Meanwhile, the three graphs in FIG. 10B correspond to desired light amounts $L_1$, $L_2$, and $L_3$, and each illustrate an example of a change in light emission amount of an OLED. Note that desired light amount $L_1$ is greatest and desired light amount $L_3$ is smallest among the three desired light amounts. As illustrated in FIG. 10B, the drop in light emission amount of the OLED occurring as the cumulative light emission duration becomes longer is greatest for desired light amount $L_1$. From this, it can be assumed that the greater the desired light amount is, the faster an OLED deteriorates (FIG. 11B).

Therefore, when attempting to achieve the reception of the same light exposure amount from the OLEDs 201 by adjusting the desired light amounts of OLEDs 201, deterioration at a greater rate is observed for OLEDs 201 emitting light in higher surrounding temperatures than others and OLEDs 201 requiring greater driving current amounts than others. In view of this, the deterioration calculation unit 801 calculates a deterioration index D for an OLED 201 with a desired light amount $L_j$ according to the following formula.

$$D = \sum_{k=1}^{M} \delta_{jk} H_k$$

Here, $H_k$ indicates a duration of time for which the surrounding temperature is $T_k$. $\delta_{jk}$ indicates the deterioration factor (deterioration rate) when the desired light amount of the OLED 201 is $L_j$ and the surrounding temperature of the target OLED 201 is $T_k$. The greater the deterioration factor $\delta_{jk}$ for an OLED is, the faster the OLED deteriorates.

FIG. 12A, FIG. 12B, and FIG. 12C are examples of the deterioration factor table 802 when both N and M equal 3. For instance, the deterioration factor when an OLED 201 has emitted light for a duration $H_1$ in a surrounding temperature $T_1$ with driving current amount $I_1$ supplied thereto can be specified as $\delta_{11}=1.07$, by referring to a column in the deterioration factor table 802 for duration $H_1$ that is indicated by the combination of surrounding temperature $T_1$ and driving current amount $I_1$ (FIG. 12B). Accordingly, the deterioration index D of this OLED 201 is calculated as the following.

$$D=1.07 \times H_1$$

Further, the deterioration factor when the same OLED 201 has emitted light for a duration $H_2$ in a lower surrounding temperature $T_2$ with a driving current amount $I_1$ supplied thereto can be specified as $\delta_{12}=1.13$, by referring to a column in the deterioration factor table 802 for duration $H_2$ that is indicated by the combination of surrounding temperature $T_2$ and the driving current amount $I_1$ (FIG. 12C). Accordingly, the deterioration index D of this OLED 201 is calculated as the following.

$$D=1.07 \times H_1 + 1.13 \times H_2$$

Then, in S903, the driving current amount correction unit 804 calculates a correction factor for calculating the corrected driving current amount to be actually supplied to the target OLED 201. Here, The driving current amount correction unit 804 first calculates a correction factor γ corresponding to the deterioration index D of the target OLED 201 calculated in S902 by referring to the correction factor table 805 corresponding to the deterioration index D. Here, one correction factor table 805 is provided for each deterioration index D, and a given correction factor table 805 stores correction factors γ each corresponding to a different combination of one desired light amount $L_n$ and one surrounding temperature $T_m$. In specifying the correction factor γ for the target OLED 201, the driving current amount correction unit 804 refers to a column in the correction factor table 805 corresponding to a surrounding temperature $T_m$ that coincides with the surrounding temperature measured in S901.

Then, the driving current amount correction unit 804 calculates the corrected driving current amount to be actually supplied to the target OLED 201 to cause the target OLED 201 to emit the desired light amount $L_n$ regardless of the deterioration that the OLED 201 has undergone. The calculation is executed by reading out a preset driving current amount $I_n$ corresponding to the desired light amount $L_n$ of the target OLED 201 from the preset current amount storage unit 806, and by multiplying the preset driving current amount $I_n$ by the correction factor γ.

FIG. 13A, FIG. 13B, and FIG. 13C are examples of the correction factor table 805. The correction factor γ for causing an OLED 201 whose deterioration index D is 1.07 to emit the desired light amount $L_1$ in surrounding temperature $T_1$ is 1.005 (FIG. 13B). Accordingly, the corrected driving current amount for the OLED 201 can be calculated by multiplying the preset driving current amount $I_1$ by the correction factor γ, as in the following.

$$I=1.005 \times I_1$$

In a similar manner, the driving current amount correction unit 804 calculates the corrected driving current amount for each of the OLEDs 201.

Then, in S904, the cumulative light emission duration updating unit 808 adds the amount of time that the target OLED 201 has performed light emission in the surrounding temperature measured in Step S401 with the driving current amount calculated in Step S903 supplied thereto to the cumulative light emission duration for the combination of the surrounding temperature and the driving current amount. Further, the cumulative light emission duration updating unit 808 causes the cumulative light emission duration storage unit 803 to store the updated cumulative light emission duration.

This configuration achieves correction of the change of light amounts of the OLEDs 201 with high accuracy, even when the change of light amount occurring when the surrounding temperature changes differs among the OLEDs 201 due to the OLEDs 201 undergoing deterioration. Further, since the configuration utilizes the level of deterioration of OLEDs 201 as a parameter, data structure is simplified and stored table size (data amount) is reduced compared to a configuration where correction factors are directly associated with cumulative light emission durations each corresponding to a different combination of a driving current amount and surrounding temperature.

[3] Modifications

Up to this point, description has been provided based on two embodiments of the present invention. However, it goes without saying that the present invention should not be construed as being limited to the embodiments. That is, modifications such as those described in the following should be construed as being within the spirit and scope of the present invention.

(1) In the embodiments, measurement of surrounding temperature is performed before causing OLEDs 201 to emit light. However, it goes without saying that the present invention should not be construed as being limited to this. Measurement of surrounding temperature may be conducted for each print job or for each page. Alternatively, when a rapid change in surrounding temperature is expected (for example, during warm-up of a fixing device), measurement of surrounding temperature may be conducted for each line.

(2) In the embodiments, the temperature of the driver IC 302 is measured as the surrounding temperature of the OLEDs 201. However, it goes without saying that the present invention should not be construed as being limited to this, and the following modification is possible, for example.

The temperatures of the OLEDs 201 themselves are correlated with the surrounding temperature of the OLEDs 201. Accordingly, the surrounding temperature of the OLEDs 201 approximates the temperatures of the OLEDs 201 themselves. Specifically, a temperature of an OLED 201 changes depending upon, for instance, the atmospheric temperature around the OLED 201, the temperature of the TFT substrate 300, and the heat generated by the OLED 201 itself.

That is, the temperatures of the OLEDs 201 themselves are correlated with, for example, the temperature of the TFT substrate 300, on which the driver IC 302 is disposed, and the atmospheric temperature around the OLEDs 201. Accordingly, the temperature of the TFT substrate 300, the atmospheric temperature around the OLEDs 201, or the like may be measured as the surrounding temperature of the OLEDs 201.

In addition, because all the OLEDs 201 are mounted on the TFT substrate 300, thermal conduction via the TFT substrate 300 causes all the OLEDs 201 to have similar temperatures. Accordingly, it suffices for the measurement of the surrounding temperature to be conducted for only one of the OLEDs 201.

(3) In the embodiments, description is provided that a luminance signal may be a current signal or a voltage signal. In specific, the following modification is possible.

Figure 14:
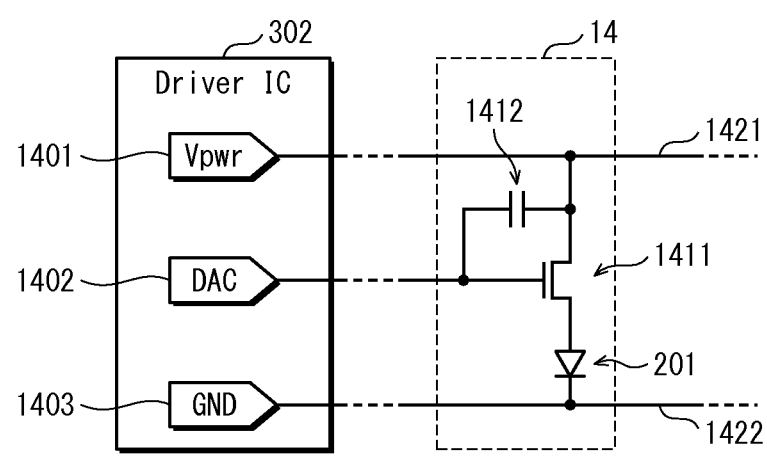
FIG. 14 is a circuit diagram illustrating an example of a driving circuit that causes an OLED 201 to emit light.
Figure 15:
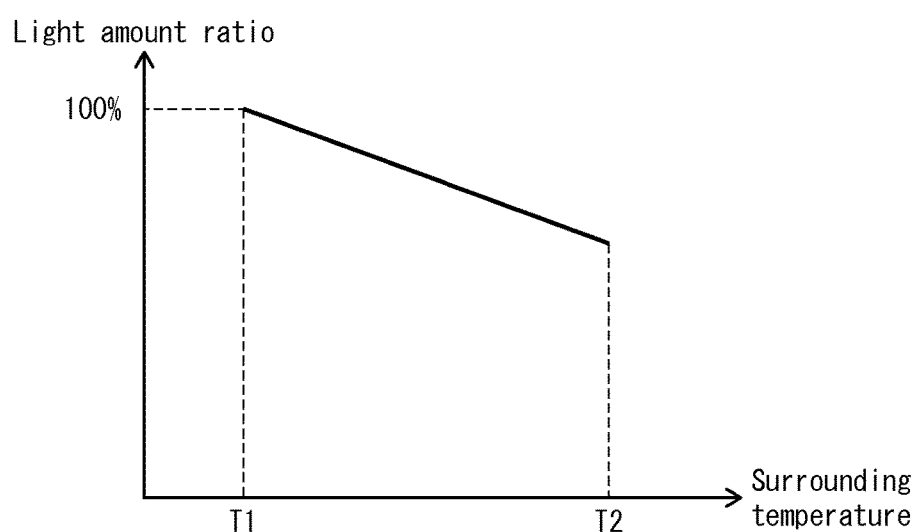
FIG. 15 is a graph illustrating an example of a temperature characteristic of an OLED when supposing that the OLED emits 100% light amount at surrounding temperature $T_1$.
Figure 16:
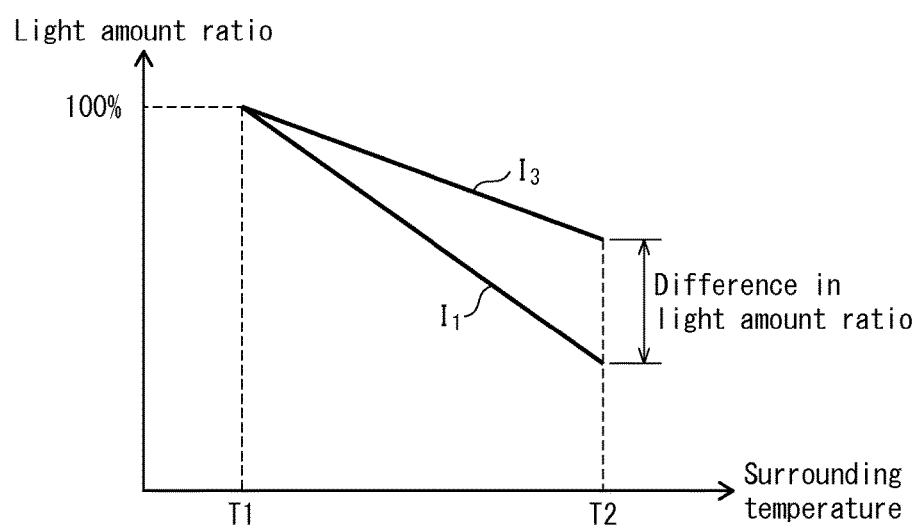
FIG. 16 includes graphs each corresponding to a different driving current amount and illustrating an example of the temperature characteristic of an OLED when supposing that the OLED emits 100% light amount at surrounding temperature $T_1$.

FIG. 14 is a circuit diagram illustrating an example of a driving circuit causing an OLED 201 to emit light. As illustrated in FIG. 14, the driving circuit 14 includes one OLED 201, one driving TFT 1411, and one capacitor 1412. When causing the OLED 201 to emit light, a luminance signal output from the DAC 1402 charges the capacitor 1412.

The voltage across terminals of the capacitor 1412 is applied between a gate terminal and a source terminal of the driving TFT 1411. The source terminal of the driving TFT 1411 is connected to a power supply wiring 1421, and the drain terminal of the driving TFT 1411 is connected to an anode terminal of the OLED 201. Further, a cathode terminal of the OLED 201 is connected to a ground terminal 1403 via a ground wiring 1422.

The driving TFT 1411 receives current supply from the power supply wiring 1421 via the power supply 1401, and supplies a driving current in accordance with the voltage across the gate terminal and the source terminal to the OLED 201. This causes the OLED 201 to emit a light amount that is in accordance with the luminance signal.

With this circuit configuration, the DAC 1402 may output a direct voltage as a luminance signal, which is to be applied to the capacitor 1412. Alternatively, the DAC 1402 may inject charge to the capacitor 1412 by conducting a predetermined amount of direct current for a predetermined amount of time, as the luminance signal. In either case, the driving current amount to be supplied to the OLED 201 may be controlled by controlling the voltage across terminals of the capacitor 1412.

(4) In the embodiments, the driver ID 302 corrects driving current amounts to be supplied to the OLEDs 201. However, it goes without saying that the present invention should not be construed as being limited to this. Alternatively, the control unit 102 may adjust the digital output signals to correct the driving current amounts to be supplied to the OLEDs 201.

(5) In the second embodiment, a deterioration index D is calculated by utilizing a deterioration factor δ corresponding to a combination of one surrounding temperature and one driving current amount. However, it goes without saying that the present invention should not be construed as being limited to this. For example, the following modification is possible.

For instance, when driving current amounts vary within a small range or when the change in deterioration index D brought about by variation of driving current amounts is relatively small, the deterioration index D may be calculated by utilizing a deterioration factor δ dependent upon only surrounding temperature. Meanwhile, when change in deterioration index D brought about by variation of driving current amounts is small, the deterioration index D may be calculated by utilizing a deterioration factor δ dependent upon only driving current amount. This modification achieves an effect similar to the second embodiment. Further, this modification also achieves a reduction in data amount of the deterioration factor table 802, which leads to a reduction in storage capacity required for storing the deterioration factor table 802.

(6) In the second embodiment, the deterioration factor table 802 stores deterioration factors δ each corresponding to a different combination of one cumulative light emission duration, one surrounding temperature, and one driving current amount. However, it goes without saying that the present invention should not be construed as being limited to this. That is, a range of cumulative light emission durations may be utilized instead of the cumulative light emission duration, and a range of surrounding temperatures may be utilized instead of the surrounding temperature.

When making such a modification, surrounding temperature ranges may have different sizes, and a size of one surrounding temperature range may be greater than or smaller than a size of another surrounding temperature range according to the influence that the one surrounding temperature range has on the deterioration index D of OLEDs 201. Specifically, a wide surrounding temperature range may be set in a temperature range within which the deterioration index D does not change much over a great range of surrounding temperatures. Further, a small surrounding temperature range may be set in a temperature range within which the deterioration index D changes greatly within a small range of surrounding temperatures.

This modification achieves storing deterioration factors δ enabling accurate calculation of the deterioration index D while keeping the table size of the deterioration factor table 802 within a desirable range.

This similarly applies to when using surrounding temperature ranges in the correction factor table 805. Further, while FIG. 13A, FIG. 13B, and FIG. 13C illustrates examples of the correction factor table 805 corresponding to different deterioration factors δ, it goes without saying that the present invention should not be construed as being limited to this. That is, different correction factor tables 805 corresponding to different ranges of the deterioration factor δ may be provided. In such a case, the sizes of ranges of the deterioration factor δ may be adjusted in accordance with the characteristics of the OLEDs 201.

(7) In the second embodiment, a deterioration index D is calculated by utilizing a cumulative light emission duration. However, it goes without saying that the present invention should not be construed as being limited to this. That is, when all pixels are caused to perform light emission for the same amount of time, the deterioration index D for an OLED 201 may be calculated by utilizing a total number of times for which the OLED 201 has emitted light, instead of a cumulative light emission duration for the OLED 201. Because the total number of times an OLED 201 has performed light emission can be calculated by simply providing a counter to each of the OLEDs 201, a reduction in storage capacity is achieved compared to when storing cumulative light emission durations.

(8) In the embodiments, the light-emitting device is an optical writing device. However, it goes without saying that the present invention should not be construed as being limited to this. That is, the present invention can be applied to OLEDs 201 in an illumination device. This modification achieves the same effects as described above, since the deterioration of such OLEDs 201 also affects the change in light amounts of the OLEDs 201 occurring when surrounding temperature changes.

(9) In the embodiments, the image forming device 1 is a color printer device of a tandem type. However, it goes without saying that the present invention should not be construed as being limited to this. The present invention is applicable to a color printer device of types other than a tandem type, or a monochrome printer device. Further, a similar effect can be obtained when the present invention is applied to copiers including a scanner device, facsimile devices having a communication function, and multi-function peripherals (MFPs) including all such functions.

[4] Summary

As described in the embodiments, one aspect of the present invention is a light-emitting device including a light-emitting element and causing the light emitting element to emit different light amounts, the light-emitting device including: a measurement unit measuring a surrounding temperature of the light-emitting element; a predetermined value storage unit storing a predetermined value of a driving signal for causing the light-emitting element to emit light; and a driving signal calculation unit executing calculation of a value of the driving signal for causing the light-emitting element to emit a desired light amount by applying a correction factor in accordance with the measured surrounding temperature and the desired light amount to the predetermined value of the driving signal.

This enables correcting, with high accuracy, a change in a light emission amount occurring when surrounding temperature changes even when the temperature characteristic of an OLED changes.

The light-emitting device pertaining to one aspect of the present invention may further include a correction factor storage unit storing a plurality of correction factors each corresponding to a combination of one desired light amount and one surrounding temperature value, and the driving signal calculation unit may execute the calculation by utilizing one of the correction factors stored in the correction factor storage unit.

The light-emitting device pertaining to one aspect of the present invention may further include a deterioration calculation unit calculating a deterioration index for the light-emitting element, and the driving signal calculation unit may execute the calculation by applying, to the predetermined value of the driving signal, a correction factor in accordance with the measured surrounding temperature, the desired light amount, and the deterioration index.

In the light-emitting device pertaining to one aspect of the present invention, the deterioration calculation unit may calculate the deterioration index by utilizing (i) cumulative light emission durations each corresponding to a surrounding temperature used in the past and indicating a total amount of time during which the light-emitting element has emitted light in the surrounding temperature; (ii) cumulative light emission durations each corresponding to a value of the driving signal used in the past and indicating a total amount of time during which the light-emitting element has emitted light based on the value of the driving signal; or (iii) cumulative light emission durations each corresponding to a different combination of a surrounding temperature measured in the past and a value of the driving signal used in the past and indicating a total amount of time during which the light-emitting element has emitted light in the surrounding temperature and based on the value of the driving signal.

The light-emitting device pertaining to one aspect of the present invention may further include a deterioration factor storage unit storing (i) deterioration factors each corresponding to a surrounding temperature; (ii) deterioration factors each corresponding to a value of the driving signal; or (iii) deterioration factors each corresponding to a different combination of a surrounding temperature and a value of the driving signal, and the deterioration calculation unit may calculate the deterioration index by multiplying the cumulative light emission durations by corresponding deterioration factors.

In the light-emitting device pertaining to one aspect of the present invention, the deterioration calculation unit may calculate the deterioration index for the light-emitting element such that the higher the surrounding temperature measured in the past and the greater the light amounts indicated by the value of the driving signals used in the past, the greater the deterioration index.

The light-emitting device pertaining to one aspect of the present invention may further include a correction factor storage unit storing a plurality of correction factors each corresponding to a combination of one desired light amount, one surrounding temperature value, and one deterioration index, and the driving signal calculation unit may execute the calculation by utilizing one of the correction factors stored in the correction factor storage unit.

In the light-emitting device pertaining to one aspect of the present invention, the driving signal may be a current signal or a voltage signal.

In the light-emitting device pertaining to one aspect of the present invention, the light-emitting element may be an organic light-emitting diode.

Further, another aspect of the present invention may be an image forming device including: a light-emitting device including a light-emitting element and causing the light emitting element to emit different light amounts, the light-emitting device including: a measurement unit measuring a surrounding temperature of the light-emitting element; a predetermined value storage unit storing a predetermined value of a driving signal for causing the light-emitting element to emit light; and a driving signal calculation unit executing calculation of a value of the driving signal for causing the light-emitting element to emit a desired light amount by applying a correction factor in accordance with the measured surrounding temperature and the desired light amount to the predetermined value of the driving signal; a photoreceptor onto which the light-emitting device executes optical writing; and a light collection unit collecting light emitted from the light-emitting element reaching the photoreceptor, and the light-emitting element is plural and arranged in line, and different regions on the light collection unit have different transmittance, each of the different regions corresponding to one of the light-emitting elements.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming device comprising:
   a light-emitting device including a plurality of light-emitting elements each emitting light of the same emission wavelength;
   a measurement unit measuring a surrounding temperature of the light-emitting elements;
   a desired light amount storage unit for storing a respective desired light amount for each of the light-emitting elements;
   a predetermined value storage unit storing a respective predetermined value for a respective driving signal for causing each of the light-emitting elements to emit light; and
   a driving signal calculation unit executing calculation of a respective corrected value of the respective driving signal for causing each of the light-emitting elements to emit the respective desired light amount by applying a respective correction factor in accordance with the measured surrounding temperature to the predetermined value of the respective driving signal, the respective desired light amounts for the light-emitting elements including some desired light amounts that are different from other desired light amounts so that some light-emitting elements emit a different amount of light than other light-emitting elements;

wherein the correction factors are set according to the desired light amount for each of the light-emitting elements, the correction factors comprising some correction values that are different from other correction values causing the some light-emitting elements to emit the different amount of light than the other light-emitting elements.

2. The image forming device of claim 1 further comprising:

a correction factor storage unit storing a plurality of correction factors each corresponding to a combination of one desired light amount and one surrounding temperature value, wherein the driving signal calculation unit executes the calculation by utilizing one of the correction factors stored in the correction factor storage unit.

3. The image forming device of claim 1 further comprising:

a deterioration calculation unit calculating a deterioration index for the light-emitting elements, wherein the driving signal calculation unit executes the calculation by applying, to the predetermined values of the driving signals, the correction factors in accordance with the measured surrounding temperature, the desired light amount, and the deterioration index.

4. The image forming device of claim 3, wherein the deterioration calculation unit calculates the deterioration index by utilizing:

(i) cumulative light emission durations each corresponding to a past surrounding temperature which indicate a total amount of time during which the light-emitting elements have emitted light in the past surrounding temperature;

(ii) cumulative light emission durations each corresponding to values of past driving signals which indicate a total amount of time during which the light-emitting elements have emitted light based on the values of the past driving signals; or (iii) cumulative light emission durations each corresponding to a different combination of the past surrounding temperature and values of the past driving signals which indicate a total amount of time during which the light-emitting elements have emitted light in the past surrounding temperature and based on the past values of the driving signals.

5. The image forming device of claim 4 further comprising:

a deterioration factor storage unit storing:

(i) deterioration factors each corresponding to a surrounding temperature;

(ii) deterioration factors each corresponding to values of the driving signals; or (iii) deterioration factors each corresponding to a different combination of a surrounding temperature and values of the driving signals, wherein the deterioration calculation unit calculates the deterioration index by multiplying the cumulative light emission durations by corresponding deterioration factors.

6. The image forming device of claim 3, wherein the deterioration calculation unit calculates the deterioration index for the light-emitting elements such that the higher a measured past surrounding temperature and the greater the light amounts indicated by the values of the past driving signals, the greater the deterioration index.

7. The image forming device of claim 3 further comprising:

a correction factor storage unit storing a plurality of correction factors each corresponding to a combination of one desired light amount, one surrounding temperature value, and one deterioration index, wherein the driving signal calculation unit executes the calculation by utilizing one of the correction factors stored in the correction factor storage unit.

8. The image forming device of claim 1, wherein the driving signal is a current signal or a voltage signal.

9. The image forming device of claim 1, wherein each of the light-emitting elements is an organic light-emitting diode.

10. An image forming device comprising:

a light-emitting device including a plurality of light-emitting elements each emitting light of the same emission wavelength and causing the light emitting elements to emit different light amounts, the light-emitting device comprising:

a measurement unit measuring a surrounding temperature of the light-emitting elements;

a desired light amount storage unit for storing a respective desired light amount for each of the light-emitting elements;

a predetermined value storage unit storing a respective predetermined value for a respective driving signal for causing each of the light-emitting elements to emit light; and a driving signal calculation unit executing calculation of a respective corrected value of the respective driving signal for causing each of the light-emitting elements to emit the respective desired light amount by applying a respective correction factor in accordance with the measured surrounding temperature to the predetermined value of the respective driving signal, the respective desired light amounts for the light-emitting elements including some desired light amounts that are different from other desired light amounts so that some light-emitting elements emit a different amount of light than other light-emitting elements;

a photoreceptor onto which the light-emitting device executes optical writing; and a light collection unit collecting light emitted from the light-emitting elements including the some light-emitting elements and the other light-emitting elements, the light collection unit exposing the photoreceptor to the collected light which has a uniform light amount;

wherein the correction factors are set according to the desired light amount for the light-emitting elements, the correction factors comprising some correction values that are different from other correction values causing the some light-emitting elements to emit the different amount of light than the other light-emitting elements.

11. The image forming device of claim 10, wherein the light collection unit is a lens array.

12. The image forming device of claim 10, wherein the light-emitting elements are linearly arranged, and different regions of the light collection unit have different transmittance, each of the different regions corresponding to one of the light-emitting elements.

* * * * *